United States Patent [19]

Avicola

[11] Patent Number: 4,649,529
[45] Date of Patent: Mar. 10, 1987

[54] MULTI-CHANNEL FIBER OPTIC SENSOR SYSTEM

[75] Inventor: Kenneth Avicola, Kingwood, Tex.

[73] Assignee: Exxon Production Research Co., Houston, Tex.

[21] Appl. No.: 803,456

[22] Filed: Dec. 2, 1985

[51] Int. Cl.$^4$ .......................................... H04R 23/00
[52] U.S. Cl. .................................. 367/149; 367/141; 367/154; 350/358; 350/96.15
[58] Field of Search ............... 367/140, 141, 149, 154, 367/20; 350/358, 352, 96.16, 96.15, 96.13; 73/657

[56] References Cited

U.S. PATENT DOCUMENTS

| | | | |
|---|---|---|---|
| 4,111,521 | 9/1978 | Steifer et al. | 350/96.15 |
| 4,268,116 | 5/1981 | Schmadel et al. | 350/96.29 |
| 4,313,185 | 1/1982 | Chovan | 367/149 |
| 4,320,475 | 3/1982 | Leclerc et al. | 367/149 |
| 4,432,599 | 2/1984 | McMahon | 350/96.15 |
| 4,486,657 | 12/1984 | Bush | 250/227 |
| 4,525,818 | 6/1985 | Cielo et al. | 367/149 |
| 4,545,253 | 10/1985 | Avicola | 73/655 |

FOREIGN PATENT DOCUMENTS

2504263 10/1982 France .
2145237A 3/1985 United Kingdom .

OTHER PUBLICATIONS

J. A. Bucaro, et al., "Fiber-Optic Hydrophone", J. Acoustic Society of America, V. 62, No. 5, pp. 1302-1304, (1977).

E. L. Green, et al., "Remote Passive Phase Sensor", presented at the Third International Conference on Optical Fiber Sensors, held in San Diego, Feb. 13-14, 1985.

J. P. Dakin, et al., "Novel Optical Fiber Hydrophone Array Using a Single Laser Source and Detector", Electronics Letters, vol. 20, No. 1, (Jan. 5, 1984), pp. 53-54.

*Primary Examiner*—Charles T. Jordan
*Assistant Examiner*—John W. Eldred
*Attorney, Agent, or Firm*—Alfred A. Equitz

[57] ABSTRACT

A time division multiplexing, fiber optic data gathering system, including two or more sensors formed on an optical fiber, and a phase sensitive detector. Each sensor includes two reflectors separated by a section of the fiber having length L. Each reflector may be activated so that when an interrogating light signal propagates in a first direction past the activated reflector, a portion of the interrogating light signal will be reflected back into a direction opposite the first direction. Each reflector may also be deactivated so that the interrogating signal may propagate unhindered past the deactivated reflector. Variations in the optical path length between the reflectors of a sensor, due to changes in an external parameter of interest, will cause phase modulations that are extracted in the phase sensitive detector by homodyne or heterodyne techniques. In a preferred embodiment, the activated reflectors produce a specific type of acoustic field resulting from superposition of two acoustic waves, which acoustic field will interact with the interrogating light signal so as to reflect a portion of the interrogating light signal by 180°.

14 Claims, 5 Drawing Figures

MULTI-CHANNEL FIBER OPTIC SENSOR SYSTEM

FIELD OF THE INVENTION

The present invention relates generally to systems employing time division multiplexing for gathering data from two or more sensors. More particularly, the invention relates to time division multiplexing data gathering systems including two or more sensors, where each sensor is capable of modulating the phase of a reflected portion of interrogating light signal in response to variations in an incident signal, and also including a phase sensitive detector capable of measuring phase modulations associated with the reflected light from each of the sensors.

BACKGROUND OF THE INVENTION

In gathering data from a large number of sensors, two general types of methods have been used. In the first, a wire pair is run from each sensor to a data recording unit. In the second, some form of multiplexing is used so that data from many sensors is impressed on a data bus consisting of a single wire pair, coaxial cable, or optical cable. In practicing the second type of method, a saving in wire (or other data transmission material) and space for cable runs is realized. However, in practicing conventional embodiments of such type of method, a significant amount of electronic equipment has generally been required to digitize and encode information from each sensor input location. In practicing the method of the present invention, the advantages of multiplexing are obtained, and the amount of electronic equipment required at each sensor-data bus interface is reduced.

One important application for the present invention is in the field of marine seismology. In marine seismology the most commonly employed technique for obtaining geophysical data is the reflection seismograph technique which typically requires the use of a large number of hydrophone arrays connected to form what is known as a "marine streamer." The marine streamer is towed behind a seismic vessel. The individual hydrophones may be made up of a piezoelectric element which converts acoustic signals to electrical signals. Marine streamers typically use electrical cables to transmit such electrical signals from the submerged hydrophones to instruments which display or record these signals on board the seismic vessel.

A typical marine streamer may have 200 hydrophone arrays. Each array may be 15 meters long and may be made up of 17 hydrophones in parallel. Such a marine streamer would be three kilometers long, would have 3400 hydrophones, and would require at least 400 wires running the length of the electrical cable to connect each array with the vessel. In addition, other wires would be needed for depth measurement, control, and other purposes. The cable diameter necessary for accommodating such a large number of wires would be about 3 inches.

Longer marine streamers are desirable, but extension of the apparatus commonly used in the art would be awkward because of the need for increased cable diameter to accommodate such increased length. Another approach that has been taken utilizes a digital streamer. In this type of system, the data from each array is digitized, multiplexed, and then transmitted down a data bus to instruments on board the seismic vessel. This digital streamer approach, although allowing smaller diameter streamers, results in a more expensive system in the water, and usually requires relatively large diameter electronics packages positioned at various locations along the streamer which act as noise sources as the streamer is dragged through the water.

Systems have been proposed which employ optical transducers for converting acoustic vibrations incident on a device such as a hydrophone or geophone into optical signals, and then into electrical signals. Such systems would replace the conventional piezoelectric transducers with generally more complex fiber optic transducers. The problem of transmitting many such signals down the streamer remains the same.

One method of alleviating the problem of increased cable diameter is through the use of optical fibers in place of the electrical wiring. Fiber optic systems have been proposed which convert incident acoustic vibrations into optical signals and maintain such optical signals in optical form for transmission. Some of such previously proposed systems require a separate fiber (or fiber pair) for each sensor. Others of such previously proposed systems employ couplers and lossy sensors which cause an excess optical loss each time light propagates through them, and hence severely limit the number of signals which practically can be handled.

One method for producing a reflection in an optical fiber is described in U.S. Pat. No. 4,545,253 issued Oct. 8, 1985 to Avicola. This method employs evanescent coupling between two fiber segments separated by a looped section of fiber to cause a portion of light propagating down the fiber to be coupled from one segment to the other segment so as to propagate back along the fiber in the opposite direction. The fiber can be unbroken in this method. Although the excess losses in this arrangement are significantly lower than with a coupler, they are still too large to permit hundreds of such reflection points on a single fiber. Furthermore, the reflectors of U.S. Pat. No. 4,545,253 are permanent in the sense that the excess loss results every time light traverses the reflectors and such losses affect operation of all the reflectors formed downstream from any particular reflector on a single fiber.

Other known methods for producing a reflection in an optical fiber include: introducing a discontinuity in the fiber such as by breaking the fiber and reconnecting the broken ends; mechanically introducing a microscopic taper to the fiber; and exposing a portion of the fiber to spatially periodic pertubations of the optical refractive index of the cladding surrounding the fiber core. The latter method is described in U.K. Pat. Application No. GB 2,145,237A by Chevron Research Company, published Mar. 20, 1985, at page 5, lines 65 through page 6, line 35. These known methods of forming a reflector on a fiber all have the disadvantage that they result in a permanent reflector. There is an optical loss at each permanent reflector whenever light passes through it, and such losses affect all sensors associated with all the reflectors downstream of any particular reflector on a fiber. As a result of the losses, a large number of such permanent reflectors could not be accommodated on a single fiber.

Another type of fiber optic transducer mechanism relies on phase modulation in a single mode fiber immersed in a fluid. The phase modulation in such a system is due to changes in the optical length of the fiber induced by sound waves propagating in the fluid. An example of such technique is described in J. A. Bucaro, H. D. Dardy, and E. F. Carone, "Fiber-optic hydrophone", Journal Acoustic Society of America, Vol. 62, No. 5, pp. 1302-1304, 1977. The Bucaro paper does not teach or suggest any system in which several sensors are formed on the same fiber, nor does it teach or suggest any sensor that reflects a portion of an interrogating light signal for subsequent detection and processing.

A related optical transducer system is disclosed in U.S. Pat. No. 4,313,185 issued Jan. 26, 1982 to Chovan. Chovan discloses a hydrophone system comprising a first and a second single mode optical fiber and means for coupling light from the first fiber to the second fiber and from the second fiber to the first fiber. The optical length of the optical coupling path between the two fibers is modulated in response to acoustic vibrations incident on the fibers. The phase and frequency of light traversing the optical coupling path will vary with the optical length of the path and the rate of change thereof, respectively. Chovan, however, neither teaches nor suggests any system in which several sensors are formed on the same fiber, nor does it teach or suggest any sensor that reflects a portion of in interrogating light signal for subsequent detection and processing.

Other typical sensors and multiplexing schemes are described in the paper by E. L. Green, et al. entitled "Remote Passive Phase Sensor," presented at the Third International Conference on Optical Fiber Sensors held in San Diego, Feb. 13-14, 1985; and in above-referenced U.K. Pat. Application No. GB 2,145,237A. The system of the U.K. Patent Application includes a number of sensors formed on an optical fiber which are interrogated by an interrogating wavelength scanning laser signal. Each sensor includes a pair of reflectors designed so as to reflect a particular wavelength band of the swept frequency interrogating signal. The reflected signals are detected and processed in accordance with complex, wavelength division demultiplexing technique. The complexity of the demultiplexing technique is an important disadvantage. Furthermore, the methods for forming the reflectors disclosed in the U.K. Patent Application all have the disadvantage that they result in a permanent reflector, so that there is an optical loss at each permanent reflector whenever light passes through it. Such losses will affect all sensors associated with all the reflectors formed downstream of any particular reflector on the fiber.

The Green, et al. paper describes another technique for interrogating a remote interferometric sensor formed on an optical fiber by analyzing reflected light produced in the sensor when an interrogating light signal passes through the sensor. The sensor of the Green, et al. system includes a partial reflector and a full reflector. The system also includes a compensating interferometer defining two paths of different length. The path difference compensates for the time delay between the back reflected beams from the two reflectors. After propagating through the two paths, the reflected light is recombined and the phase of the recombined signal is measured. The Green, et al. paper does not suggest how to construct or operate reflectors which can be switched between an active state, in which a portion of light passing through the reflector is reflected, and an inactive state in which light passes through the sensor substantially unhindered. The Green, et al. detection scheme is a homodyne detection method employing feedback to a phase modulator to maintain, at the quadrature point, the phase of the two signals to be recombined. Green, et al. does not suggest any heterodyne detection technique, such as one in which the reflectors associated with a sensor themselves produce the optical frequency shift needed to facilitate heterodyne detection.

SUMMARY OF THE INVENTION

The invention is a time division multiplexing data gathering system including an optical fiber, two or more sensors formed on the fiber, and a phase sensitive detector. Each sensor includes two reflectors (a single reflector may be shared by two sensors). Each reflector may be switched between an active state in which the reflector reflects a portion of an interrogating light signal propagating along the fiber through the reflector, and a deactivated state in which light may propagate along the fiber through the reflector substantially unhindered. Each pair of reflected signals associated with the reflector pair of a sensor may be uniquely identified by time division multiplexing. The phase sensitive detector measures phase modulations associated with each such pair of reflected signals.

In a preferred embodiment, each reflector includes means for generating two acoustic waves which will propagate into the fiber at selected angles so that each propagates in the fiber in a direction 45° with respect to the fiber's longitudinal axis and perpendicular to the direction of the other. Light traveling along the fiber's longitudinal axis will interact with the acoustic field resulting from superposition of the two acoustic waves so as to be partially reflected 180° back along the fiber axis. The fiber region in which the acousto-optical interaction occurs will be referred to herein as the "interaction region" (or the "interaction portion"). This type of reflector may be activated when desired to introduce the described pairs of acoustic waves into the interaction region. Normally, the reflectors will be kept in a deactivated state so that light may propagate through the interaction region unhindered (i.e., with no excess loss).

In one variation on this preferred embodiment, each acoustic wave in the pair associated with a reflector originates at a different transducer, so that each acoustic wave may have an independently selected frequency. If two different frequencies are chosen, the light wave reflected by the reflector will have an upshifted or downshifted frequency. In another variation, the reflector includes a single transducer, and the first acoustic wave is a portion of the acoustic wave energy generated by the transducer which propagates through the substrate directly into the fiber. The second acoustic wave is another portion of the acoustic wave energy generated by the single transducer, which reflects from a surface of the substrate and thereafter refracts into the fiber. Because this second variation requires only a single transducer, it is simpler to fabricate than the first variation. Also, the second embodiment permits a more favorable interaction region geometry, which permits reduced acoustic loss in the fiber cladding for an interaction region of sufficient length along the longitudinal axis of the fiber, and hence results in greater diffraction efficiency. However, in the second variation the two acoustic waves (i.e., the reflected and non-reflected portions of the acoustic wave energy generated by the single transducer) will have identical frequency, so that the reflector in the second variation can be used only as a reflector, and not an optical frequency shifter.

In a preferred embodiment, the phase sensitive detector includes a compensating reference leg interferometer. The reflected light signals from the sensors are diverted from the main fiber into another fiber, and thereafter into means for splitting the reflected signals into two portions. The splitting means may be a Bragg cell or directional coupler. One portion of the split signal propagates through a reference optical fiber of length 2L+M, where L is the distance between the reflectors of each sensor. The other portion of the split signal propagates through a short optical fiber of length M. The two portions are recombined in another directional coupler, and the recombined signal is detected by a photodetector and analyzed in a phase sensitive demodulation unit. Variations in the optical path length of the main fiber section between the reflectors of a sensor (such as may result from pressure variations due to an impinging acoustic signal incident on the section of the main fiber between two reflectors) will cause phase modulations in the recombined reflected optical signal from the sensor, which modulations are extracted in the phase demodulation unit. In one embodiment, in which the reflected optical signals from a given sensor have the same frequency, the technique known as homodyne detection is employed. In a preferred embodiment, a Bragg cell is used to shift the frequency of a portion of the reflected light in either the reference fiber (or the short fiber) relative to the frequency of light in the short fiber (or reference fiber), so that the technique known as heterodyne detection may be employed. In another preferred embodiment, reflectors capable of producing reflected signals of frequency different than that of the interrogating signal are employed, the reflected signals from the reflectors in each sensor are caused to have different frequencies, and heterodyne detection is employed. In this second preferred embodiment, the reflectors themselves perform the frequency shifting needed to utilize heterodyne detection.

DESCRIPTION OF THE PREFERRED EMBODIMENTS

Figures 1, 2:
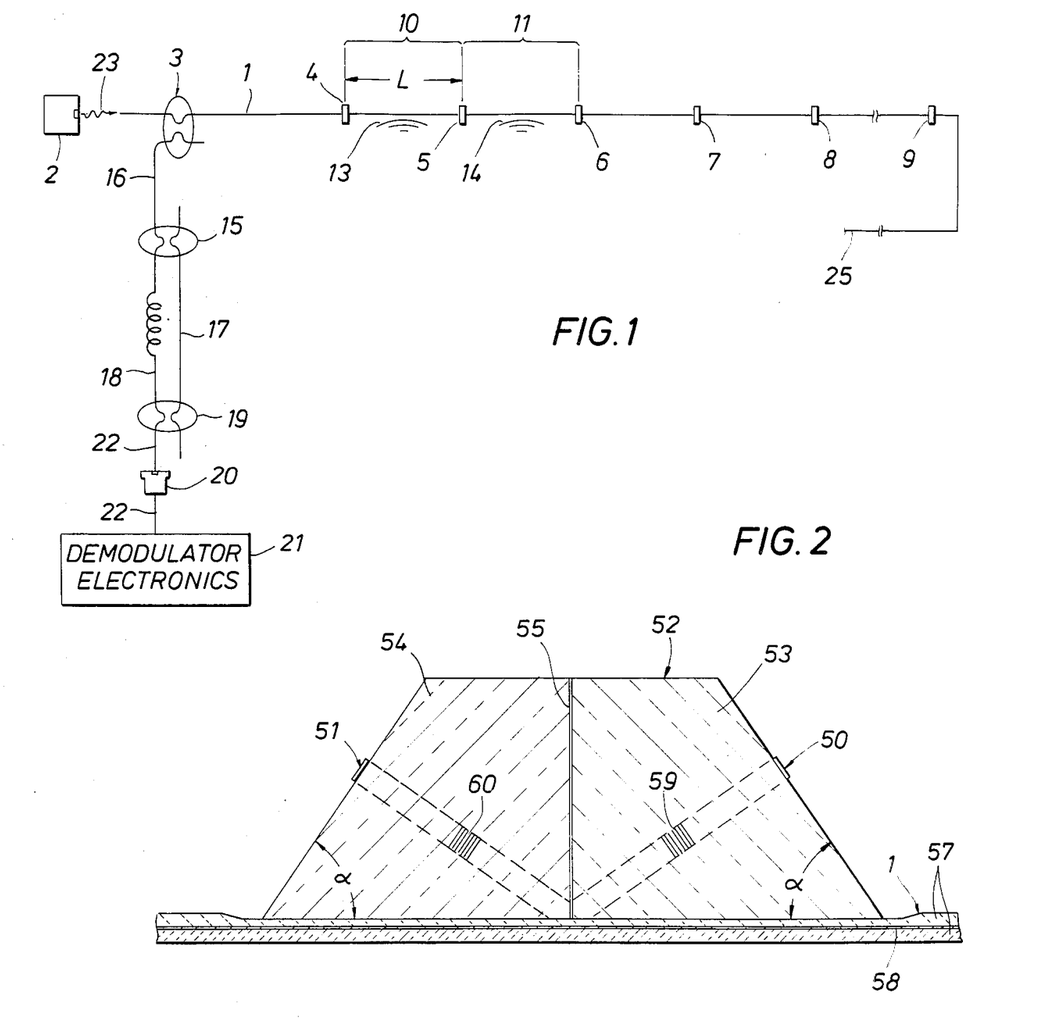
FIG. 1 is a schematic diagram of a first embodiment of the data gathering system of the invention.
FIG. 2 is a cross-sectional view of one type of reflector that may be used in a preferred embodiment of the inventive system, and an associated optical fiber, taken in a plane which includes the longitudinal fiber axis.

FIG. 1 is a schematic diagram of a preferred embodiment of the data gathering system of the invention. Reflectors 4, 5, 6, 7, 8, and 9 are formed on main optical fiber 1. Although six reflectors are shown, more than six reflectors may be employed, as suggested by the break in between reflections 8 and 9 indicating that the portion of the system between reflectors 8 and 9 is not shown. Similarly, three, four, or five reflectors (instead of six reflectors) may be employed. Each reflector is capable of being operated in an active state in which the reflector will reflect a portion of an interrogating light signal, such as signal 23, as the light signal propagates along the longitudinal axis of fiber 1 through the reflector. Each reflector is also capable of operating in a deactivated state, in which an interrogating light signal may pass substantially unhindered therethrough. In one embodiment, the reflectors may be selectively activated (or deactivated) in response to externally generated command signals. In another embodiment, the reflectors will switch between the activated and deactivated states in response to internally generated timing signals. The preferred embodiments of the reflectors will be described in detail below with reference to FIGS. 2, 3, and 4.

Fiber 1 should be a polarization preserving fiber designed for low loss and single-mode operation at the operating frequency. A suitable single-mode fiber may be fabricated in a manner well known in the art by choosing fiber dimensions and materials of fabrication so that only the lowest order mode will propagate as a guided wave in the fiber.

Transmitter 2, capable of launching an interrogating light signal (such as signal 23) into main fiber 1, is positioned at one end of fiber 1. Transmitter 2 may be a laser diode or any other suitable light source selected from those types well known in the art. In a preferred embodiment, transmitter 2 will be a Nd:YAG laser operating at a wavelength of 1.3 microns. The interrogating signal propagates through directional coupler 3 and along fiber 1 to reflectors 4-9.

Each sensor, such as sensor 10 or sensor 11, is associated with two reflectors and hence with pairs of reflected signals from the two reflectors. The section of main fiber 1 between the two reflectors of a sensor will undergo variations in its optical length in response to variations in the external conditions impinging thereon (such as external pressure). Thus, variations in the relative phase of the two reflected signals from the reflectors of a sensor, are indicative of variations in the external conditions impinging on the section of fiber between the two reflectors. The phase difference between the reflected signals associated with a sensor is modulated by the external signal of interest (which may be an acoustic signal such as acoustic signal 13 or acoustic signal 14) impinging on the relevant fiber section at the time the interrogating light signal passes therethrough.

Directional coupler 3 will divert part of the reflected signal from each of reflectors 4-9 to directional coupler 15 via optical fiber 16. One output port of directional coupler 15 is coupled to one end of short optical fiber 17 having length M, and the other output port is coupled to one end of reference optical fiber 18 having length 2L+M (where L is the length of the section of fiber 1 between each reflector pair of a sensor). The other ends of fibers 17 and 18 are coupled to directional coupler 19. One output port of coupler 19 is coupled to optical fiber 22. Fiber 22 conveys the recombined light signal emerging from coupler 19 to photodetector 20.

A suitable photodetector may be selected from those well known in the art. For example, photodetector Model C30950F manufactured by RCA, has been found satisfactory for a system employing optical fibers designed for single mode operation at 850 nm. The output of coupler 19 may be processed by demodulator electronics unit 21 (to be discussed in greater detail below). Electronics unit 21 is suitably connected to photodetector 20 such as by wire 22.

Directional couplers 3, 15, and 19 may be selected from those well known in the art. For example, directional coupler Model FC244, manufactured by Canadian Instrumentation and Research Limited, is suitable for a data gathering system employing optical fibers designed for single mode operation at 850 nm.

The wavelength of the interrogating light signal should be in one of the low loss regions of the optical fibers employed, to minimize attenuation. Such low loss windows typically occur near 0.85 micrometers, 1.3 micrometers, and 1.55 micrometers. Injection laser diodes operating in such regions would be preferred for use as transmitter 2 in systems with a moderate number of sensors. In systems requiring a large number (hundreds) of sensors more powerful laser sources, such as Nd:YAG, would be preferred. The interrogating light signal may be a short pulse, or may be a continuous wave. The reflectors will generate reflected signals only at times when both the following conditions occur: the interrogating light signal is passing through the reflector; and the reflector has been switched into an activated condition.

The reflected signal from each reflector may be uniquely identified by time division multiplexing provided that the interrogating pulse width (or the period of reflector activation) is sufficiently narrow so that the individual reflected signals may be distinguished. This will occur if the two-way light propagation time between the reflectors of a sensor is greater than the reflected signal pulse width. If the individual reflectors are evenly spaced from each other, and the interrogating signal has sufficiently narrow pulse width (or the period of reflector activation is sufficiently short), the reflected signals from adjacent reflectors detector sections will arrive at coupler 15 separated by a time interval T=2nL/c, where L is the fiber length between adjacent reflectors, n is the index of refraction of the core of fiber 1, and c is the speed of light in a vacuum. To ensure resolution of signals between sensors, an added length of fiber, which may be coiled, can be coupled between the sensors to provide the required delay.

In order for the return signal from the reflector farthest from transmitter 2 (reflector 9 in FIG. 1) to be distinct from any reflected pulse from end 25 of fiber 1, it is preferred that the distance between end 25 and such farthest reflector be of the same magnitude as, or greater than, the distance between adjacent sensors. Alternatively, end 25 of fiber 1 may be connected to an energy absorptive termination (not shown in FIG. 1) to substantially eliminate any reflected pulse therefrom. Such an energy absorptive termination may be selected from those well known in the art. For example, end 25 may be immersed in a container of fluid whose refractive index matches that of the core of fiber 1.

In order for the inventive system to operate with a very large number (for example, hundreds) of sensors, the reflectors must have extremely low optical loss when "off" (not reflecting), but a moderate excess loss when "on" can be tolerated. In operation, an interrogating light signal (for example, a pulse having 150 ns pulse width) would be used to read out one fiber section including, for example, ten 15 meter sensors (i.e. ten sensors for which L=15 meters), and then a small delay inserted so that a new 150 ns interrogating light pulse is used to interrogate a next section of the fiber including a second group of sensors. Thus, moderate excess optical loss associated with reflections of the first pulse in the sensors of the first group will not affect interrogation of the second group of sensors. It should be appreciated however, that because of laser coherence length limitations, it is necessary to use the "same" light for a given sensor readout.

FIG. 2 is a cross-sectional view of one preferred embodiment of a reflector suitable for use as part of the inventive system. The reflector includes first acoustic transducer 50, second acoustic transducer 51, and substrate 52. Substrate 52 is bonded to cladding 57 of optical fiber 1. Core 58 of fiber 1 extends along the central longitudinal axis of fiber 1. Substrate 52 includes first region 53 through which first acoustic wave 59 produced by transducer 50 may propagate into fiber 1, second region 54 through which second acoustic wave 60 produced by transducer 51 may propagate into fiber 1, and acoustically absorbent element 55 positioned between first region 53 and second region 54.

Substrate 52 is simply the medium through which the acoustic waves are conveyed to fiber 1, and preferably has low acoustic attenuation characteristics. Suitable low attenuation materials for the first and second regions of substrate 52 include Li NbO$_3$, YIG, Al$_2$O$_3$, Ti O$_2$, YAG, or MgAl$_2$O$_4$. Suitable materials for use in the reflector substrate include those anisotropic materials which have been used in conventional high frequency Bragg cells. Due to their anisotropy, these materials will have a preferred orientation with respect to the transducer and fiber for minimizing acoustic attenuations. The substrate need not have any particular optical properties, and may be optically opaque. Therefore, there may be suitable substrate materials outside the class of substrates used in conventional Bragg cells (which do have particular optical properties), including isotropic materials. For the purpose of description of FIG. 2, the substrate will be assumed to be Lithium Niobate (Li NbO$_3$). Absorbent element 55 may be the bonding material used to join the two substrate regions, such as epoxy.

Transducers 50 and 51 may be conventional ultrasonic transducers of the type used for Bragg cells. Such transducers may be made from Li Nb O$_3$ or other piezoelectric material. In an embodiment where transducers 50 and 51 are identical ultrasonic transducers, application of an RF pulse of frequency f and duration t to transducer 50 will launch into substrate 52 ultrasonic wave 59 of frequency f and duration t, and application of a similar pulse to transducer 51 will launch into substrate 52 ultrasonic wave 60 of frequency f and duration t. Ultrasonic waves 59 and 60 will propagate through the substrate and into the fiber as shown in FIG. 2. The ultrasonic waves should intersect at right angles in the fiber, and the wavefronts in the fiber should both be oriented at an angle of 45° with respect to the fiber axis. The portion of the fiber in which the acoustic waves intersect will be referred to through this application as the "interaction portion" (or "interaction region") of the fiber. For waves 59 and 60 to travel in a silica fiber at an angle of 45° with respect to the fiber axis, the angle α between the fiber axis and the substrate surface to which the ultrasonic transducer is mounted must be:

$$\alpha = \text{Sin}^{-1}(V_L \text{ Sin } 45°/V_s) \quad (3)$$

where $V_L$ and $V_s$ are the sound velocities in Lithium Niobate and silica respectively. This relation follows from Snell's Law. Because $V_L = 6.57 \times 10^3$ M/S and $V_s = 5.96 \times 10^3$ M/S, α should be 51.2° in this embodiment of the reflector.

Figure 3:
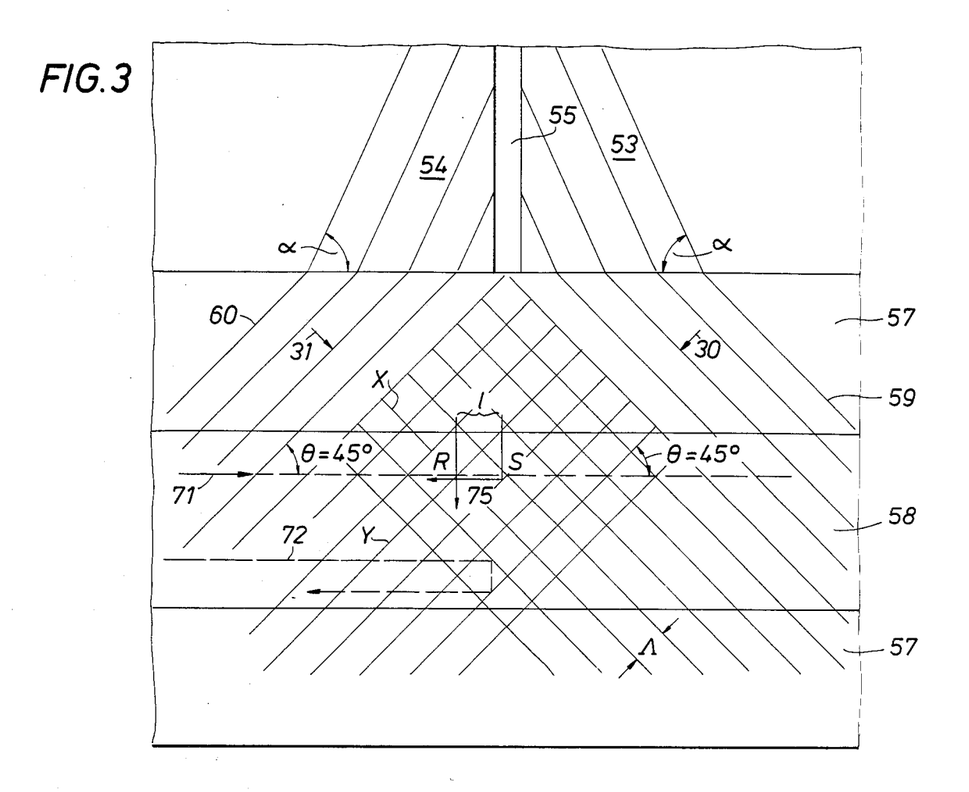
FIG. 3 is an expanded view of the interaction region of the embodiment shown in FIG. 2.

FIG. 3 shows an expanded view of the interaction region of the embodiment shown in FIG. 2. FIG. 3 shows the geometry of the acousto-optical interaction resulting in the desired back reflection. The wavefronts of acoustic waves 59 and 60 which propagate through the interaction region in the fiber should be substantially planar, so that light propagating through the interaction region will encounter substantially flat acoustic wavefronts such as wavefront X of wave train 59 and wavefront Y of wave train 60. Consider light wave 71, of wavelength λ in the fiber 1, as it propagates along the fiber axis toward the right in FIG. 3, and encounters the intersection points R, S, etc., of acoustic wave trains 59 and 60. The refractive index gradient in the fiber at these points is in the direction light wave 71 is traveling and therefore, due to the acousto-optical interaction between light wave 71 and the acoustic field due to superposition of wave trains 59 and 60, a reflection at 180° (i.e., a back reflection) will occur. The amplitude of the reflected light is at a maximum when l, the distance between R and S, is equal to λ/2. Higher order maxima exist at the spacings corresponding to l=3λ/2, 5λ/2, ..., M λ/2 (where M is any positive odd integer). Also, since l=Λ/Cos φ, where Λ is the acoustic wavelength in the fiber, φ=45°, and Λ=V/f, where V is the acoustic velocity in the fiber, it follows that f=2V/M λ Cos φ, or, $$f = \frac{2nv}{M\lambda_o \cos \phi} \quad (4)$$

where n is the average optical refractive index of the fiber (i.e., the fiber's optical refractive index in the absence of any acoustic wave propagating through the fiber), and $\lambda_o$ is the free space wavelength of light wave 71. If $\lambda_o = 1.3 \times 10^{-6} M$, n=1.46, and $V=5.96 \times 10^3$ M/S, then f=(1/M) 18.93 GHz. The ultrasonic strain has the effect of a diffraction grating on light wave 71. The possible frequencies of operation of the reflector are f= 18.93 GHz, 6.31 GHz, 3.78 GHz and so on, in the described example. Because of the difficulties inherent in operating at the higher GHz frequencies (including transducer fabrication problems and the fact that attenuation increases with the square of frequency), and because the intensity of the reflected light wave in the higher diffraction orders falls off very rapidly, a tradeoff is involved in selecting the best operating frequency. A frequency of operation of 6.31 GHz in the described example is one option. This corresponds to a path length difference of 3λ/2. There is another possible approach, and that is to start with a transducer at lower fundamental frequency and operate it at a higher even harmonic. It is well known that Bragg cells can be operated in this manner, but that the bandwidths over which they operate are correspondingly reduced at the higher harmonics. In the invention of this application, wide bandwidth is not required. Thus, in the described example, one may operate at 18.93 GHz using transducers of 2.7 GHz fundamental frequency, but driven at the seventh harmonic or 18.93 GHz.

Referring again to FIG. 3, it can be seen that the path length difference for light wave 72, after two reflections, is the same as the path length difference for light wave 71, and therefore the conditions for reflection maxima are the same for all light rays propagating along the fiber axis into the interaction region. The acoustic field, resulting from superposition in the interaction region of the acoustic waves injected therein, acts much like a Porro prism which has the property of retroreflecting light in one plane.

In a conventional Bragg cell, the diffracted optical beam is doppler shifted in frequency by an amount equal to the acoustic frequency. In a variation on a conventional Bragg cell in which a 180° diffraction is produced, with the same $\lambda_o$, n and V used above, the resulting optical frequency shift would be 18.93 GHz.

However, in the FIG. 2 reflector embodiment, there is no optical frequency shift if the frequencies of acoustic waves 59 and 60 are the same. This can be understood with reference to FIG. 3. In FIG. 3, first acoustic wave train 59 propagates in fiber cladding 57 and fiber core 58 in the direction of arrow 30 and second acoustic wave train 60 propagates in cladding 57 and core 58 in the direction of arrow 31. Assume that wave trains 59 and 60 have identical frequencies. The "mirror" at point R is formed by the intersection of wavefront X of wave 59 and wavefront Y of wave 60 at a particular instant. At some time later, the point R will have moved downward in the direction of arrow 75 (i.e., perpendicular to the longitudinal axis of the fiber). Thus, the "mirror" has no velocity component in the direction parallel to light ray 71, and so will not cause a frequency shift in the reflected optical signal.

The FIG. 2 embodiment of the reflector does produce an optical frequency shift in the reflected light beam, however, if the frequencies of acoustic beams 59 and 60 are not identical. In this variation of the FIG. 2 embodiment, if the frequency of first acoustic wave train 59 is higher, the "mirror" formed by the intersection of two wave fronts will have a velocity component, $V_p$, in the direction away from the approaching light and therefore a downshift in the reflected light beam occurs. The reflected light beam would be upshifted if the frequency of second acoustic wave train 60 were higher. The amount of the optical frequency shift would be:

$$\Delta \nu = \frac{2nV(f_1 - f_2) \sin \theta}{\lambda_o f} \quad (5)$$

where $f_1$ is the frequency in the fiber of first acoustic wave train 59, $f_2$ is the frequency in the fiber of second acoustic wave train 60, and all other symbols are as previously defined. The reflected light frequency produced in the FIG. 2 reflector can be controlled by varying the frequency difference, $f_1 - f_2$, such as by driving the first and second transducers at selected unequal frequencies. This capability enables a particular type of heterodyne detection technique (to be described in detail below) to be employed for demodulating the signal detected at photodetector 20 of the FIG. 1 embodiment of the inventive system.

The first and second acoustic transducers of the FIG. 2 embodiment of the reflector must be oriented and the substrate must be shaped so that acoustic waves emitted from the first and second acoustic transducers will each enter the fiber at the necessary angle so as to produce in the fiber interaction region an acoustic field of the type described above with reference to FIG. 3. Preferably, the substrate will include an acoustically absorbent element, such as epoxy, bonded between two regions of substrate material having low acoustic attenuation properties. Such an absorbent element will reduce undesired reflections within the substrate and at the substrate-fiber interface.

Figure 4:
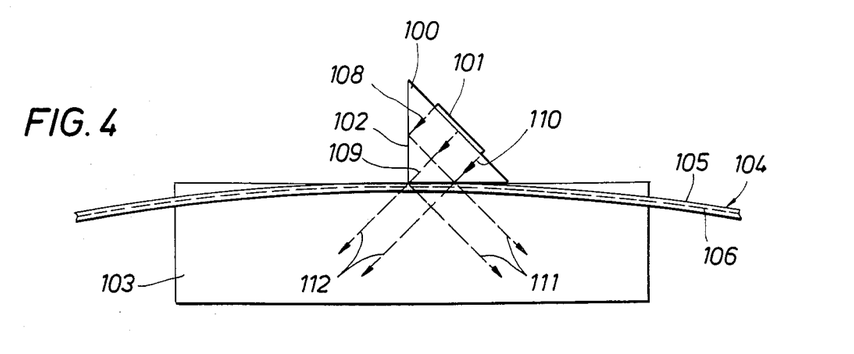
FIG. 4 is a cross-sectional view of another type of reflector that may be used in a preferred embodiment of the inventive system, and an associated optical fiber, taken in a plane which includes the longitudinal fiber axis.

FIG. 4 is a cross-sectional view of a second preferred embodiment of a reflector suitable for use in the inventive system. Acoustic transducer 101 launches acoustic wave energy into substrate 100, so that the acoustic wave initially propagates in the direction of rays 108, 109, and 110. The portion of the acoustic wave initially propagating through substrate 100 in the region between rays 109 and 110 is refracted directly into cladding 105 of optical fiber 104 so as to propagate in cladding 105 and core 106 of fiber 104 in the direction of rays 112. This non-reflected wave energy will be referred to as the first acoustic wave as it propagates in the fiber. The portion of the acoustic wave initially propagating through substrate 100 in the region between rays 108 and 109 reflects from surface 102 of substrate 100 and thereafter, is refracted into fiber 104 so as to propagate in fiber 104 in the direction of rays 111. This reflected portion will be referred to as the second acoustic wave as it propagates in the fiber. The direction of rays 111 should be 45° with respect to the longitudinal fiber axis, and the direction of rays 112 should be substantially 45° with respect to the longitudinal fiber axis and perpendicular to the direction of rays 111.

Transducer 101 and substrate 100 may be of the same type, respectively, as transducer 50 and substrate region 53 of the FIG. 2 embodiment, and may be bonded to each other and to the fiber in the same manner as in the FIG. 2. Care must be taken so that substrate 100 is properly oriented, and transducer 101 and surface 102 are properly positioned, relative to optical fiber 104 so that the reflected and non-reflected portions of the acoustic wave energy arrive at the substrate-fiber interface at the proper angle and so as to minimize acoustic losses in the substrate (which in general will depend on the orientation of the substrate relative to the direction of propagation of an acoustic wave therein).

When the FIG. 3 reflector is activated, acoustic wave energy propagates through substrate 100 in the direction of rays 108, 109, and 110. The portion of the acoustic wave energy propagating in the region between rays 108 and 109 will reflect from surface 102 of substrate 100. Surface 102 is part of the interface between substrate 102 and the surrounding medium. The surrounding medium will typically be air. The reflected acoustic radiation will be refracted into fiber cladding 105 so as to propagate therein as a first wave in the direction of rays 111. A portion of the acoustic wave energy propagating in substrate 100 in the region between rays 109 and 110 will be refracted into fiber cladding 105 so as to propagate therein as a second wave in the direction of rays 112. Rays 111 and 112 must both be oriented approximately 45° with respect to the longitudinal axis of the fiber and must be approximately perpendicular with respect to each other. An interrogating light wave propagating along fiber 104 will encounter the interaction portion in which both first wave 111 and second wave 112 propagate, and a portion of the energy in the light wave will be reflected back in the direction 180° away from the original light propagation direction due to the acousto-optical interactions in the interaction portion.

One advantage of the FIG. 4 embodiment is that only a single transducer is needed so that the reflector is simpler to fabricate. There are also other important advantages.

The reflector substrate (in any of the reflector embodiments) may be bonded to the optical fiber as follows. The fiber is first bonded into a plate (such as plate 103 of FIG. 4), in a groove which is cut into the plate. The plate may be made of fused silica. The top surface of the plate-fiber assembly is then ground and polished. A typical fiber has an outside diameter of about 125 microns, and a single mode fiber operating at an optical wavelength of 1.3 microns would typically have core diameter of about 10 microns. Preferably, after the grinding and polishing, a thin cladding layer remains between the fiber core and the top surface of the fiber-plate assembly. For a fiber of typical dimensions, this thin cladding layer should have a thickness of approximately 30 microns in the FIG. 2 embodiment. In the FIG. 4 embodiment, for a fiber of typical dimensions the optimal cladding layer thickness will be less than 30 microns, and will desirably be in the range of approximately 5 to 10 microns. When the substrate is positioned against the top surface of the fiber-plate assembly, and if a layer of cladding remains between the substrate and the core, there is no excess optical loss associated with the device when deactivated. If the acoustic waves pass through a distance of no more than about 30 microns in silica cladding to reach the fiber core, the associated attenuation loss in acoustic energy is less than 3 db if the operating frequency is 6.3 GHz.

The reflector substrate may then be bonded to the ground and polished top surface of the fiber-plate assembly by means of the same techniques used to bond GHz transducers to Bragg cells. The substrate, bonding material, and the fiber cladding and core will preferably have closely matched acoustic impedance so as to reduce acoustic reflection losses occurring when acoustic waves propagate from the substrate into the fiber.

Although two embodiments of a suitable reflector have been described with reference to FIGS. 2 and 4, other types of reflectors may be employed in the inventive system, provided that such reflectors are capable of being operated in an activated state in which the reflector will back-reflect a portion of an interrogating light signal, and in a deactivated condition in which the interrogating light signal may propagate substantially unhindered past the (deactivated) reflector.

It is desirable that optical loss at one reflector of the inventive system be prevented from affecting the reflected light signal produced at each other reflector formed on a single fiber. To achieve this desired result in either the FIG. 2 of FIG. 4 embodiments, the transducers employed in the reflectors may be selected from those commercially available which can be switched between an activated state and a deactivated state on command. In operation, the interrogating light signal would be launched into the main fiber and a selected reflector activated by switching "on" the associated transducer (or pair of transducers). All other reflectors positioned along the fiber between the light source and the selected reflector (i.e., the "upstream" reflectors) would be switched "off" to minimize attenuation of the interrogating light as it passes these upstream reflectors. At later times, possibly after a subsequent interrogating light signal has been launched into the main fiber, any desired combination of active reflectors could be achieved by appropriately activating or deactivating the individual reflectors. Alternatively, the interrogating signal will be a continuous light wave, and any desired combination of reflectors will be activated (or deactivated) at desired moments.

Signals for activating the reflectors and RF power for operating the activated reflectors, may be transmitted along a line (not shown in FIG. 1) parallel to fiber 1, and amplified at appropriate points along such line. Alternatively, RF power for operating the reflectors may be locally generated. The reflectors may be switched in response to remotely generated commands, or locally generated commands produced for example, at timed intervals.

It should be understood that for purposes of illustration an optical frequency of 1300 nm has been used herein, but that present day optical fibers also have low optical loss at 850 and 1550 nm. Extensive effort is being made to produce fibers having much less loss at longer wavelengths. If these fibers are realized, the described acousto-optic reflector devices will become easier to fabricate because of the lower operating frequencies.

Operation of the phase sensitive detector element of the inventive system may be understood by considering the reflected signals from the reflector pair of a single sensor (for example, sensor 10) of the FIG. 1 embodiment. The portion of the reflected signal from the "upstream" reflector (reflector 4) that arrives at photodetector 20 after propagating through the long path (through reference fiber 18) will arrive at photodetector 20 at the same time as will the portion of the reflected signal from the "downstream" reflector (reflector 5) that has propagated through the short path (through short fiber 17). After recombining at coupler 19, these two beams will interact on the surface of the photodetector 20. The output of photodetector 20 is processed in demodulator electronics unit 21 to extract phase information regarding the recombined signal.

Changes in the external conditions incident on sensor 10, of the type that induce an optical path length change in the fiber section between the two associated reflectors, will result in phase modulation of the output signal from photodetector 20. For example, if acoustic signal 13 impinges on sensor 10, it will change the optical path length for optical signals propagating in the fiber section between reflectors 4 and 5. It is well known that optical fiber sections whose optical length is sensitive to changes in other parameters such as temperature, magnetic field, etc., can be constructed similarly to optical fiber sections that are sensitive to acoustic signals. Usually, only the fiber coating need be changed to optimize sensitivity to the particular parameter to be sensed.

As the interrogating light signal propagates along main fiber 1, each fiber section between a pair of reflectors successively becomes the sensing fiber and is compared with the same reference leg. Down lead insensitivity results from the fact that the signals from successive reflectors traverse the same path back to the receiver, and are separated in time by the two-way travel time between reflectors.

The most common form for a fiber optic interferometric sensor is a Mach-Zender arrangement. This configuration is that which would be obtained if, in FIG. 1, light signal 23 would be injected into one port of coupler 15 and the two interferometer arms (fibers 17 and 18) would be made to have equal length. It can be seen, then, that the scheme of the inventive system is basically a Mach-Zender arrangement for path length compensation in which the sensing arm is made to be the successive main fiber sections between reflectors. The remote sensing elements are in a Fabry-Perot configuration. The sensors are read out by means of time division multiplexing.

Demodulator electronics unit 21 may be selected from any of several types known in the art. For example, a homodyne detection unit could be employed in an embodiment wherein the reflected signals all have equal frequency, so that there is no beat frequency associated with the photodetector output. For this homodyne detection method to operate effectively, the phase of the two reflected signals from any given sensor should be maintained at the quadrature point where the phase sensitivity is maximized. This may be accomplished by using feedback to a fiber stretcher (not shown in FIG. 1) inserted in one of fibers 17 or 18. However, where many sensors along main fiber 2 are to be read out in rapid succession, this feedback technique may be practically difficult to implement. An alternative method known as the synthetic heterodyne method may also be used. A piezelectric stretcher (phase shifter) is inserted in one of fibers 17 or 18 in this case. In practicing both the homodyne technique and the synthetic heterodyne technique, the light output from both ports of coupler 19 will preferably be detected to improve performance by providing some measure of laser amplitude compensation.

In a preferred embodiment, a heterodyne detection unit is employed as unit 21 for demodulating the output of photodetector 20. Preferably, this embodiment will employ reflectors of the type capable of producing reflected optical signals having frequency different from that of the interrogating light signal. An example of such a reflector was described above with reference to FIG. 2. Preferably then, suitable reflectors of this type will be employed, and appropriately driven so that the reflectors themselves perform the frequency shifting needed to utilize heterodyne detection. For example, if the "odd" reflectors (reflector 4, reflector 6, etc.) upshift the optical frequency by an amount f, and the even reflectors (reflector 5, reflector 7, . . ., reflector 9) downshift the optical frequency by an equal amount, (−f), then the output of photodetector 20 will be a signal with carrier frequency 2f. Information regarding external signal of interest that is incident on the sensors will be extracted (via the heterodyne technique) as a phase modulation on this carrier signal of frequency 2f. The phase modulation may be recovered in accordance with well known techniques using an FM discriminator or phased lock loop. For example, if acoustic signal 13 (incident on sensor 10) has frequency w, then in this embodiment, the output of photodetector 20 will be a carrier of frequency 2f, with a phase modulation of frequency w.

In another preferred embodiment, where the reflected signals from the sensors all have the same frequency, heterodyne detection may be employed if a Bragg cell frequency shifter (not shown in FIG. 1) is coupled into one of fibers 17 or 18. A suitable Bragg cell may be selected from those commercially available. If the Bragg cell shifts the frequency of the affected light by an amount f, then the carrier frequency of the signal emerging at the output of photodetector 20 will be the frequency f. The external signal of interest will then be recovered as a phase modulation on this carrier.

Figure 5:
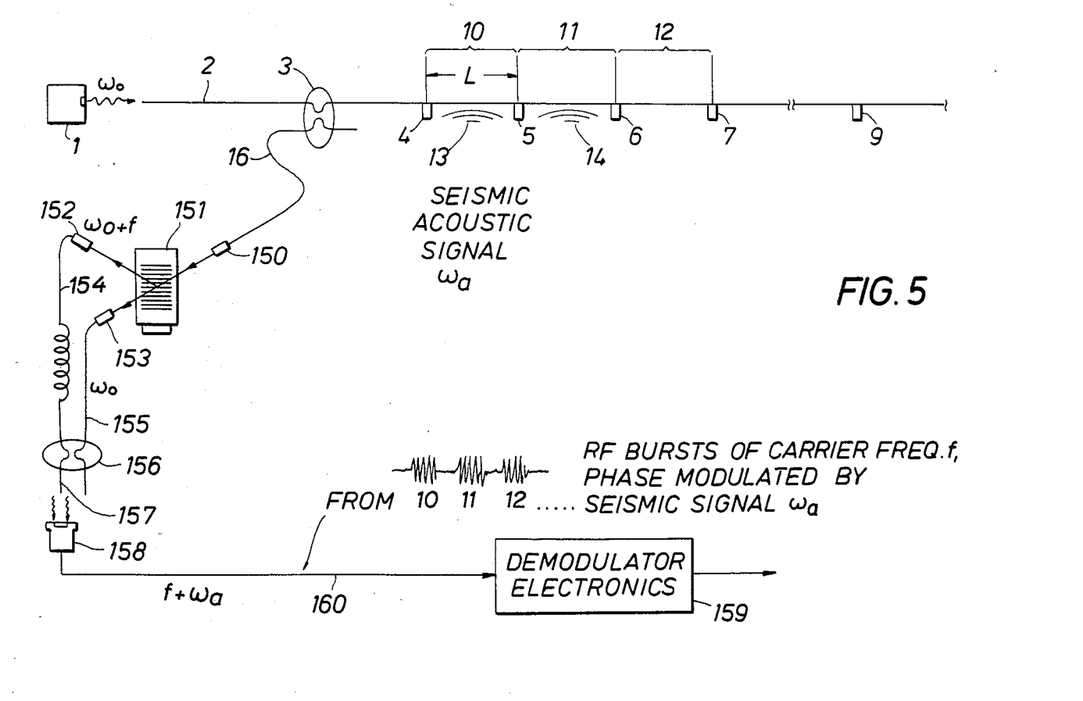
FIG. 5 is a schematic diagram of a second embodiment of the inventive data gathering system.

Yet another preferred embodiment of the invention will next be described with reference to FIG. 5. The FIG. 5 embodiment differs from the FIG. 1 embodiment, primarily in that Bragg cell 151 replaces coupler 15. In the FIG. 5 embodiment, the reflected signals from the reflectors (including reflectors 4, 5, 6, and 7) are diverted by directional coupler 3 into optical fiber 16, then emerge from fiber 16, and then enter Bragg cell 151 after being focussed at lens 150. If the reflected optical signals entering Bragg cell 151 have frequency $w_o$, then Bragg cell 151 induces frequency shift f to that portion of the light diverted through lens 152 into reference optical fiber 154, so that the light propagating through reference fiber 154 has frequency $w_o+f$. Reference fiber 154 has length $2L+M$, where L is the length of the section of main fiber 2 separating each pair of reflectors in each sensor. The portion of each light signal entering Bragg cell 151 that is undiverted therein will emerge from Bragg cell, will be focussed through lens 153 into short optical fiber 155, and will propagate in fiber 155 with frequency $w_o$. Short fiber 155 has length M. The input ports of directional coupler 156 are coupled to the downstream ends of fibers 154 and 155. The two beams emerging from Bragg cell 151 will be recombined in coupler 156, and the recombined optical signal emerging from one output port of coupler 156 will propagate through fiber 157 to photodetector 158. The output of photodetector 158 associated with each sensor will be a carrier, of frequency f, phase modulated by the external signal of interest impinging on the sensor. The photodetector output signal may be demodulated by techniques known in the art, as in the embodiments discussed in the previous two paragraphs.

It should be understood that the various embodiments described herein are illustrative only of the inventive concept and that these embodiments should not be considered as limitations on the invention. Various changes in the methods and apparatus described herein may be within the scope of the appended claims without departing from the spirit of the invention.

I claim:

1. A data gathering system, including:
    a main optical fiber through which an interrogating light signal may propagate in a first direction;
    at least three reflectors formed on the main fiber such that each reflector is separated from the nearest reflector thereto by a section of the main fiber having length L, where each reflector is capable of operating in an active state in which the reflector will reflect a portion of the interrogating light signal so that the reflected portion will propagate in a direction opposite the first direction, and each reflector is also capable of operating in a deactivated state in which the interrogating light signal may propagate substantially unhindered past the reflector and where each reflector includes a substrate bonded to the main fiber through which acoustic signals may propagate, and means for generating both a first acoustic wave which will propagate from the substrate into an interaction portion of the main fiber so as to propagate in the main fiber in a second direction at an angle approximately 45° with respect to the axis, and a second acoustic wave which will propagate from the substrate into the interaction portion so as to propagate in the main fiber in a third direction at an angle approximately 45° with respect to the axis and approximately perpendicular to the second direction; and
    a phase sensitive detector capable of measuring phase modulations associated with pairs of reflected signals, where each reflected signal in each pair originates at a pair of adjacent reflectors, and where the energy in both reflected signals in each pair is reflected from the same interrogating light signal.

2. A data gathering system, including:
    a main optical fiber having a longitudinal axis and a first end and a second end;
    a light source for transmitting into the first end of the main fiber an interrogating light signal which propagates in a first direction along the longitudinal axis of the main fiber;
    at least two sensors formed on the main fiber, each of the sensors including two reflectors separated from each other by a distance L along the longitudinal axis of the main fiber, where each reflector is capable of being switched between an active state in which the reflector will reflect a portion of the interrogating light signal into a direction opposite the first direction, and an inactive state in which the interrogating light signal may propagate substantially unhindered past the reflector, and each reflector includes a substrate bonded to the main fiber through which acoustic signals may propagate, and means for generating both a first acoustic wave which will propagate from the substrate into an interaction portion of the main fiber so as to propagate in the main fiber in a second direction at an angle approximately 45° with respect to the axis, and a second acoustic wave which will propagate from the substrate into the interaction portion so as to propagate in the main fiber in a third direction at an angle approximately 45° with respect of the axis and approximately perpendicular to the second direction; and a phase sensitive detector capable of measuring phase modulations associated with each pair of reflected signals originating at each sensor.

3. The system of claims 1 or 2, wherein the acoustic wave generation means incudes a first transducer and a second transducer, each of which is bonded to the substrate and is capable of being selectively switched between an active state in which the transducer generates acoustic wave energy, and an inactive state in which the transducer generates no acoustic wave energy.

4. The system of claim 3, wherein:
    the portion of the first acoustic wave propagating through the interaction portion of the main fiber is a planar acoustic wave having frequency $f_1$; and
    the portion of the second acoustic wave propagating through the interaction portion of the main fiber is a planar acoustic wave having frequency $f_2$, where $f_2$ is different from $f_1$.

5. The system of claims 1 or 2, wherein:
    the acoustic wave generation means includes a transducer bonded to the substrate and capable of being selectively switched between an active state in which the transducer generates acoustic wave energy and an inactive state in which the transducer generates no acoustic wave energy, where the first acoustic wave is a first portion of the acoustic wave energy generated by the transducer which propagates into the interaction portion; and
    the substrate has a surface from which a second portion of the acoustic wave energy generated by the transducer reflects and thereafter propagates into the interaction portion, where the second acoustic wave is the second portion of acoustic wave energy.

6. The system of claim 5, wherein:
    the portion of the first acoustic wave propagating through the interaction portion of the main fiber is a planar acoustic wave having frequency $f_1$; and
    the portion of the second acoustic wave propagating through the interaction portion of the main fiber is a planar acoustic wave also having frequency $f_1$, where $f_1=(2nV)/M\lambda_o$ (cosine 45°), where n is the optical refractive index of the fiber, V is the velocity of the first acoustic wave in the fiber, $\lambda_o$ is the free space wavelength of the interrogating light signal, and M is a positive odd integer.

7. The system of claims 1 or 2 wherein:

the portion of the first acoustic wave propagating through the interaction portion of the main fiber is a planar acoustic wave having frequency $f_1$; and the portion of the second acoustic wave propagating through the interaction portion of the fiber is a planar acoustic wave also having frequency $f_1$, where $f_1 = (2nV)/M\lambda_o$ (cosine 45°), where n is the optical refractive index of the fiber, V is the velocity of the first acoustic wave in the fiber, $\lambda_o$ is the free space wavelength of light desired to be reflected by the reflector as the light propagates through the interaction portion of the fiber, and M is a positive odd integer.

8. The system of claims 1 or 2, wherein the main fiber has optical refractive index, n, and wherein each reflector includes:

(a) a substrate bonded to the main fiber and having a first surface; and (b) an acoustic transducer bonded to the substrate and capable of generating planar acoustic wave energy, a first portion of which will propagate through the substrate into the main fiber so as to propagate in the main fiber as a first acoustic wave in a second direction approximately 45° with respect to the axis, and a second portion of which acoustic wave energy will reflect from the first surface and then propagate through the substrate into the fiber so as to propagate in the main fiber as a second acoustic wave in a third direction approximately 45° with respect to the axis and approximately perpendicular to the second direction.

9. The system of claims 1 or 2, wherein each reflector includes:

(a) a substrate, bonded to the main fiber, through which acoustic signals may propagate;

(b) a first transducer bonded to the substrate and capable of generating a first acoustic wave which will propagate through the substrate into an interaction portion of the main fiber such that the first acoustic wave propagates in the main fiber in a second direction at an angle approximately 45° with respect to the axis; and (c) a second transducer bonded to the substrate and capable of generating a second acoustic wave which will propagate through the substrate into the interaction portion such that the second acoustic wave propagates in the main fiber in a third direction at an angle approximately 45° with respect to the axis and approximately perpendicular to the second direction.

10. The system of claims 1 or 2, wherein the detector includes:

a first directional coupler coupled to the main fiber;

a second optical fiber, having a first end and a second end, coupled to the first directional coupler so that the reflected light signals will propagate from the main fiber through the first directional coupler and into the first end of the second fiber;

a second directional coupler attached to the second end of the second fiber;

a reference optical fiber of length 2L+M and having a first end coupled to one output port of the second directional coupler;

a short optical fiber of length M and having a first end coupled to another output port of the second directional coupler;

a third directional coupler having two input ports, one input port being coupled to a second end of the reference fiber and the other being coupled to a second end of the short fiber; and a photodetector coupled to an output port of the third directional coupler.

11. The system of claims 1 or 2, wherein the detector includes:

a first directional coupler coupled with the main fiber;

a second optical fiber, having a first end and a second end, and coupled to the first directional coupler in such a manner that the reflected light signals will propagate from the main fiber through the first directional coupler and into the first end of the second fiber;

a Bragg cell coupled to the second end of the second fiber;

a reference optical fiber of length 2L+M coupled to the Bragg cell in such a manner that frequency shifted light diverted in the Bragg cell propagates into the reference optical fiber;

a short optical fiber of length M coupled to the Bragg cell in such a manner that light not diverted in the Bragg cell propagates into the short optical fiber;

a second directional coupler having two input ports, one coupled to the reference fiber and the other coupled to the short fiber; and a photodetector coupled to an output port of the second directional coupler.

12. The system of claims 1 or 2, wherein the phase sensitive detector includes:

a first directional coupler coupled with the main fiber;

a second optical fiber, having a first end and a second end, and coupled to the first directional coupler in such a manner that the reflected light signals will propagate from the main fiber through the first directional coupler and into the first end of the second fiber;

a second directional coupler having an input port coupled with the second end of the second fiber and having two output ports;

a reference optical fiber of length 2L+M, a first end of which is coupled to a first output port of the second coupler;

a short optical fiber of length M, a first end of which is coupled to a second output port of the second coupler;

a third directional coupler having two input ports, one coupled to a second end of the reference fiber and the other coupled to a second end of the short fiber; and a photodetector coupled to an output port of the third directional coupler.

13. A data generating system, including:

a main optical fiber having a longitudinal axis and a first end and a second end;

a light source capable of transmitting into the first end of the main fiber an interrogating light signal which propagates in a first direction along the longitudinal axis of the main fiber;

a number of sensors positioned at separated locations along the main fiber, each sensor including a pair of selectively activatable reflectors, each reflector being capable of reflecting a portion of the interrogating light signal in a direction opposite the first direction, but only when said reflector is in an activated state; and means for measuring the phase associated with each pair of reflected signals originating at one of the sensors, said phase measuring means including:

a first directional coupler coupled with the main fiber;

a second optical fiber, having a first end and a second end, and coupled to the first directional coupler in such a manner that the reflected light signals will propagate from the main fiber through the first directional coupler and into the first end of the second fiber;

a Bragg cell coupled to the second end of the second fiber;

a reference optical fiber of length $2L+M$ coupled to the Bragg cell in such a manner that frequency shifted light diverted in the Bragg cell propagates into the reference optical fiber;

a short optical fiber of length M coupled to the Bragg cell in such a manner that light not diverted in the Bragg cell propagates into the short optical fiber;

a second directional coupler having two input ports, one coupled to the reference fiber and the other coupled to the short fiber; and a photodetector coupled to an output port of the second directional coupler.

14. A data gathering system, including:

a main optical fiber having a longitudinal axis and a first end and a second end;

a light source capable of transmitting into the first end of the main fiber an interrogating light signal which propagates in a first direction along the longitudinal axis of the main fiber;

a number of sensors positioned at separated locations along the main fiber, each sensor including a pair of selectively activatable reflectors, each reflector being capable of reflecting a portion of the interrogating light signal in a direction opposite the first direction, but only when said reflector is in an activated state; and means for measuring the phase associated with each pair of reflected signals originating at one of the sensors, said phase measuring means including:

a first directional coupler coupled with the main fiber;

a second optical fiber, having a first end and a second end, and coupled to the first directional coupler in such a manner that the reflected light signals will propagate from the main fiber through the first directional coupler and into the first end of the second fiber;

a second directional coupler having an input port coupled with the second end of the second fiber and having two output ports;

a reference optical fiber of length $2L+M$, a first end of which is coupled to a first output port of the second coupler;

a short optical fiber of length M, a first end of which is coupled to a second output port of the second coupler;

a third directional coupler having two input ports, one coupled to a second end of the reference fiber and the other coupled to a second end of the short fiber; and a photodetector coupled to an output port of the third directional coupler.

* * * * *